(12) United States Patent
Jeon et al.

(10) Patent No.: US 11,563,246 B2
(45) Date of Patent: Jan. 24, 2023

(54) BATTERY MODULE

(71) Applicant: SK INNOVATION CO., LTD., Seoul (KR)

(72) Inventors: Hae Ryong Jeon, Daejeon (KR); Sun Mo An, Daejeon (KR); Young Sun Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 52 days.

(21) Appl. No.: 17/342,227

(22) Filed: Jun. 8, 2021

(65) Prior Publication Data

US 2021/0391609 A1 Dec. 16, 2021

(30) Foreign Application Priority Data

Jun. 12, 2020 (KR) .................. 10-2020-0071607

(51) Int. Cl.
| | |
|---|---|
| *H01M 10/6556* | (2014.01) |
| *H01M 10/613* | (2014.01) |
| *H01M 10/647* | (2014.01) |
| *H01M 10/653* | (2014.01) |
| *H01M 10/6568* | (2014.01) |
| *H01M 50/209* | (2021.01) |

(52) U.S. Cl.
CPC ..... *H01M 10/6556* (2015.04); *H01M 10/613* (2015.04); *H01M 10/647* (2015.04); *H01M 10/653* (2015.04); *H01M 10/6568* (2015.04); *H01M 50/209* (2021.01)

(58) Field of Classification Search
CPC ........... H01M 10/6556; H01M 10/613; H01M 10/647; H01M 10/653; H01M 10/6568; H01M 50/209; H01M 10/625; H01M 10/6557; H01M 10/6567; H01M 50/249; H01M 50/291; H01M 50/211; Y02E 60/10
See application file for complete search history.

(56) References Cited

U.S. PATENT DOCUMENTS

| | | | | |
|---|---|---|---|---|
| 8,197,984 | B2 * | 6/2012 | Sugita ................ | H01M 8/0267 429/513 |
| 8,846,227 | B2 * | 9/2014 | Krammer .......... | H01M 10/6557 429/82 |
| 2004/0201366 | A1 * | 10/2004 | Kimoto ............... | H01M 10/613 320/150 |
| 2006/0049799 | A1 * | 3/2006 | Hamada .............. | H01M 10/625 320/112 |
| 2008/0292948 | A1 * | 11/2008 | Kumar ................ | H01M 10/658 429/120 |

(Continued)

FOREIGN PATENT DOCUMENTS

| | | | | |
|---|---|---|---|---|
| CN | 206441787 U | * | 8/2017 | ........ H01M 10/6555 |
| DE | 102017208816 B3 | * | 11/2018 | .............. F28F 1/022 |

(Continued)

*Primary Examiner* — Kaity V Chandler
(74) *Attorney, Agent, or Firm* — IP & T Group LLP

(57) ABSTRACT

The battery module of the present invention includes a plurality of battery cells and a heat exchange unit configured to cool the plurality of battery cells, and the heat exchange unit includes: a flow frame through which coolant inflows and outflows; and a frame cover which is in contact with the plurality of battery cells, wherein the frame cover is coupled to the flow frame to form a flow space, through which the inflowing and outflowing coolant flows, together with the flow frame.

18 Claims, 11 Drawing Sheets

(56) References Cited

U.S. PATENT DOCUMENTS

| | | | | |
|---|---|---|---|---|
| 2012/0315529 A1* | 12/2012 | Jin | | H01M 10/6556 |
| | | | | 429/120 |
| 2013/0244077 A1* | 9/2013 | Palanchon | | H01M 10/61 |
| | | | | 429/120 |
| 2016/0013526 A1* | 1/2016 | Uchiyama | | H01M 50/24 |
| | | | | 429/71 |
| 2016/0204486 A1* | 7/2016 | Kenney | | F28F 1/045 |
| | | | | 29/890.03 |
| 2018/0026320 A1* | 1/2018 | Poirier | | H01M 10/6553 |
| | | | | 429/100 |
| 2018/0069281 A1* | 3/2018 | Tutzer | | H01M 10/653 |
| 2018/0123191 A1* | 5/2018 | Dudley | | H01M 50/543 |
| 2018/0123201 A1* | 5/2018 | Fees | | H01M 50/24 |
| 2018/0131051 A1* | 5/2018 | Paramasivam | | H01M 10/625 |
| 2018/0205125 A1* | 7/2018 | Burgers | | H01M 10/6556 |
| 2018/0287227 A1* | 10/2018 | Jeong | | B60L 50/66 |
| 2019/0089026 A1* | 3/2019 | Choi | | H01M 10/613 |
| 2019/0366876 A1* | 12/2019 | Cheadle | | F28D 1/0366 |

FOREIGN PATENT DOCUMENTS

| | | | | | |
|---|---|---|---|---|---|
| DE | 102019113603 A1 * | 11/2020 | | | H01M 10/613 |
| FR | 3100608 A1 * | 3/2021 | | | F28F 3/12 |
| JP | 5417932 B2 | 2/2014 | | | |
| KR | 10-1106308 B1 | 1/2012 | | | |
| KR | 10-2018-0124403 A | 11/2018 | | | |
| KR | 10-2019-0087744 A | 7/2019 | | | |
| WO | WO-2017033412 A1 * | 3/2017 | | | H01M 10/613 |

* cited by examiner

BATTERY MODULE

CROSS-REFERENCE TO RELATED APPLICATION

This application claims priority to Korean Patent Applications No. 10-2020-0071607 filed on Jun. 12, 2020 in the Korean Intellectual Property Office, the entire disclosure of which is incorporated by reference herein.

BACKGROUND OF THE INVENTION

1. Field of the Invention

The present invention relates to a battery module, and more specifically, to a battery module including a heat exchange unit with an improved structure.

2. Description of the Related Art

In general, unlike a primary battery, research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

The lithium secondary battery may be manufactured in various forms. A typical shape thereof may include cylindrical and prismatic types, which are mainly used for the lithium ion battery. In recent years, the lithium polymer battery, which has been in the spotlight, is manufactured in a pouch type having flexibility, such that the shape thereof is relatively freely implemented.

Such a pouch type lithium polymer battery (hereinafter, referred to as a "pouch type cell") can be easily bent or warped, therefore in order to use it for a long period of time, the pouch type cell should be protected by a rigid case device. However, conventionally, for such a series connection, a method of connecting electrode tabs of each pouch to a printed circuit board (PCB) on which circuit patterns are formed, and placing the cells in a case has been used.

However, according to the method of constructing a high-power battery module by stacking such conventional pouch type cells, a lot of heat is generated by a charging or discharging operation, and the battery cells may be deteriorated due to the generated heat. Thereby, a battery pack having a structure capable of improving heat dissipation characteristics is required.

SUMMARY OF THE INVENTION

An object of the present invention is to provide a battery module with improved structure.

In addition, another object of the present invention is to provide a battery module with improved durability.

Further, another object of the present invention is to provide a battery module with improved cooling performance.

To achieve the above-described objects, according to an aspect of the present invention, there is provided a battery module including: a plurality of battery cells; and a heat exchange unit configured to cool the plurality of battery cells, wherein the heat exchange unit includes: a flow frame through which coolant inflows and outflows; and a frame cover which is in contact with the plurality of battery cells, wherein the frame cover is coupled to the flow frame to form a flow space, through which the inflowing and outflowing coolant flows, together with the flow frame.

The frame cover may be provided with a pair of frame covers disposed on one side and the other side of the flow frame, respectively, and the pair of frame covers may be configured to contact with stacked surfaces of the plurality of battery cells facing each other.

The frame cover in contact with the plurality of battery cells may be made of a material having a higher thermal conductivity than the flow frame.

The flow frame may include a plastic material, and the frame cover may be made by including a metal material.

The flow frame may include: a flow part configured to be covered by the frame covers to form the flow space; and extension parts which have an inlet and an outlet connected with the flow space and extend from the flow part.

The flow part may include: a frame body configured to form a circumference of the flow space; and a channel division part configured to divide the flow space inside the frame body.

The flow part may include gap spaces configured so that the channel division part is spaced apart from the inlet.

The channel division part may be configured to divide and guide flow of the coolant passing through the gap space through the inlet.

The battery module may include a module housing configured to form an internal space in which the plurality of battery cells and the heat exchange unit are mounted, wherein the heat exchange unit may be configured so that one side and the other side of the frame body are respectively coupled to and fixed to the module housing.

The frame body may include: a mounting part on which a circumference of the frame cover is mounted; and a mounting guide disposed along a circumference of the mounting part to guide the frame cover to be mounted on the mounting part, wherein the mounting guide may be configured to prevent the frame cover and the module case from being in contact with each other.

The mounting guide may be disposed between the mounting part and the module case, and may be configured to protrude from the mounting part along the circumference of the frame cover.

The frame body and the module case may be coupled with each other by at least one of bolting and thermal fusion.

Each of the plurality of battery cells may include: a sealing part and a circumferential part formed by a case, wherein the sealing part is formed on three sides among four sides of circumference formed by the battery cells and is formed by adhering the case, and the circumferential part is formed on a side of the battery cell other than the three sides; and a protrusion part formed between the sealing part and the circumferential part and formed to protrude from the circumferential part, wherein the frame cover may be configured to correspond to the circumferential part, and the extension part is configured to correspond to the protrusion part.

The extension part may be configured to have a second width smaller than a first width formed by the frame cover and the flow part to avoid interference with the protrusion part. The extension part may be made by including an insulation material to prevent a short circuit in the protrusion parts facing each other.

The extension part may extend from the flow part in the same plane direction as the flow part.

The extension part may include a reinforcement part configured to reinforce strengths of the inlet and the outlet.

According to an aspect of the present invention, it is possible to improve the structure of the heat exchange unit to enhance the cooling performance of the battery module.

In addition, according to an aspect of the present invention, cost reduction of the heat exchange unit may be implemented, and weight reduction of the battery module may be achieved.

Further, according to an aspect of the present invention, it is possible to easily change the shape or size of the heat exchange unit depending on the shape or arrangement of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
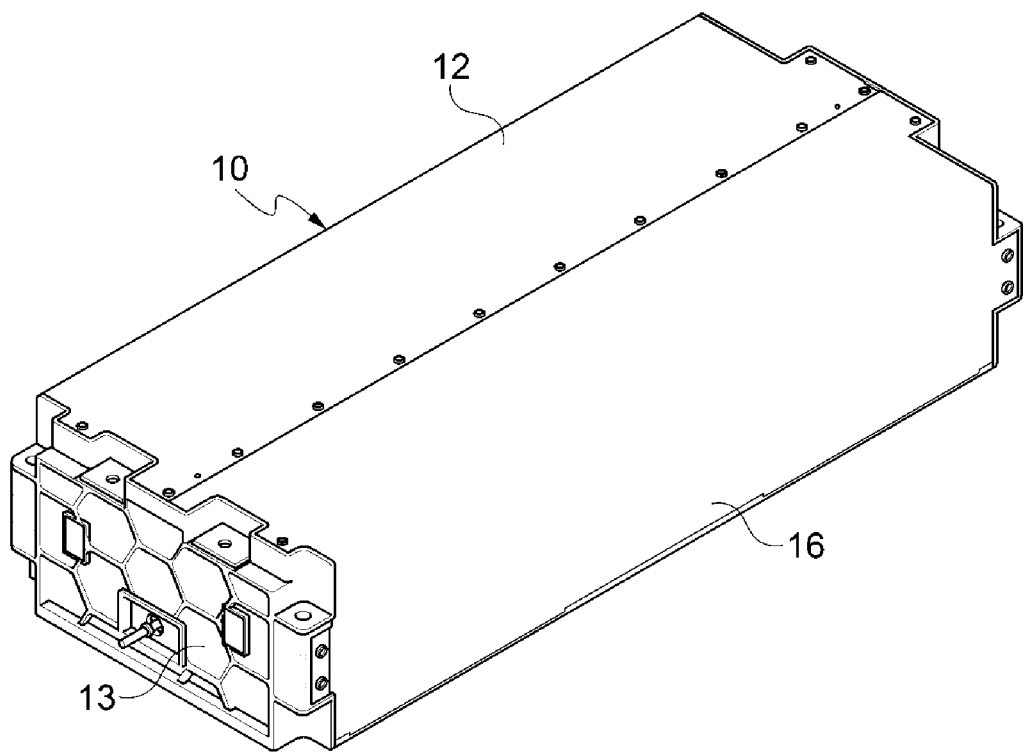
FIG. 1 is a perspective view of a battery module according to an embodiment of the present invention.

Configurations illustrated in the embodiments and drawings of the present disclosure are only preferred examples of the invention, and diverse modifications capable of replacing the embodiments and drawings of the present disclosure may be possible at a time of filing the present application.

Further, the same reference numerals or symbols in the drawings of the present disclosure will represent parts or components having substantially the same functions.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the terms including numerals such as "first," "second," etc. in the present disclosure may be used to explain different components, but such components are not limited thereto. These terms are used only to distinguish one component from other components. For example, a first component may also be named a second component without departing from the scope of the present invention. Likewise, the second component may also be named the first component. The term "and/or" may include a coupling of a plurality of related items and/or any one among the plurality of related items.

In addition, the terms such as a "part," "device," "block," "member," "module," and the like may refer to a unit to execute at least one function or operation. For example, the terms may refer to at least one hardware such as a field-programmable gate array (FPGA) or an application specific integrated circuit (ASIC), at least one operating process performed by at least one software stored in a memory or processor.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 2:
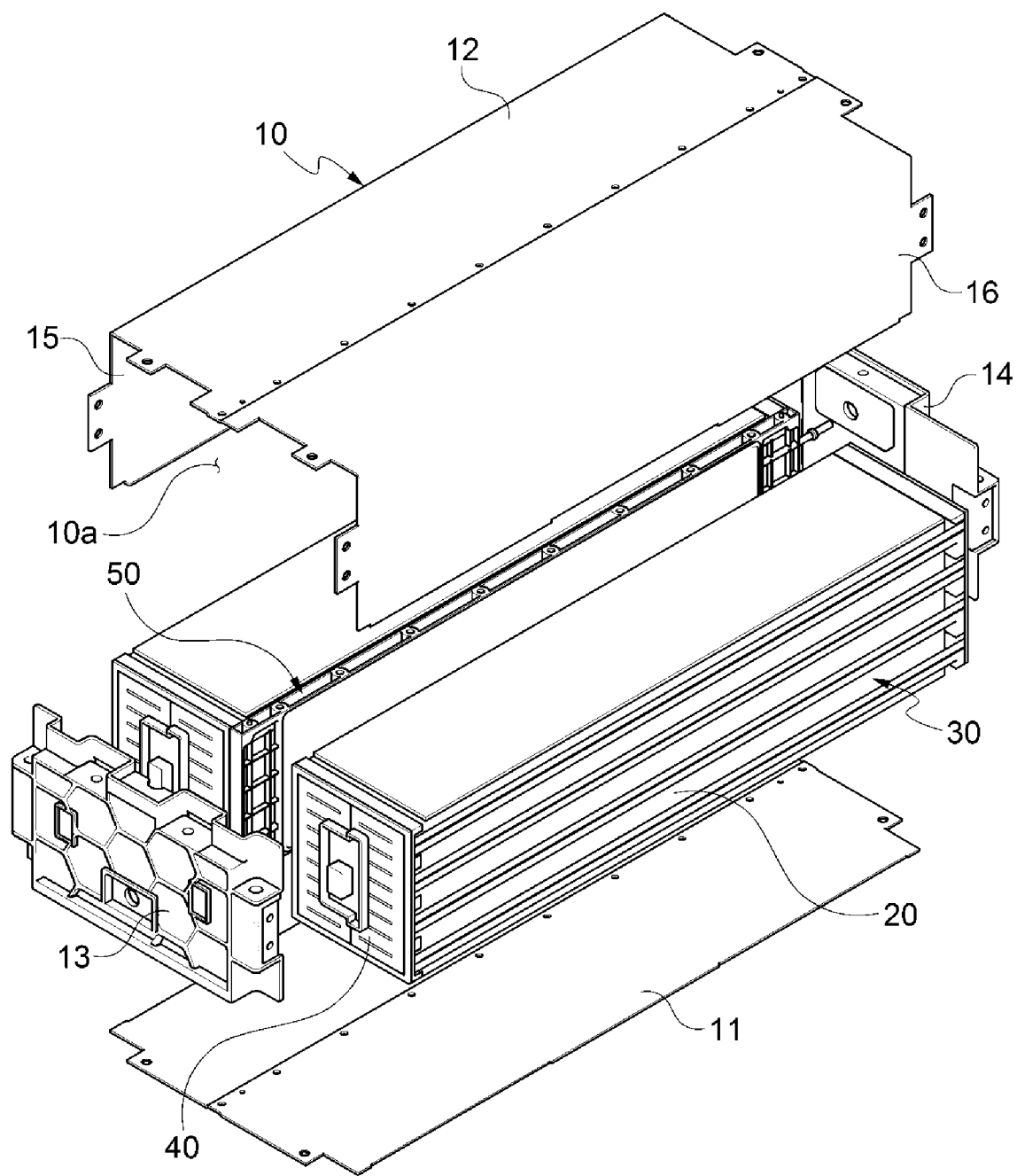
FIG. 2 is an exploded perspective view of a battery module according to an embodiment of the present invention.
Figure 3:
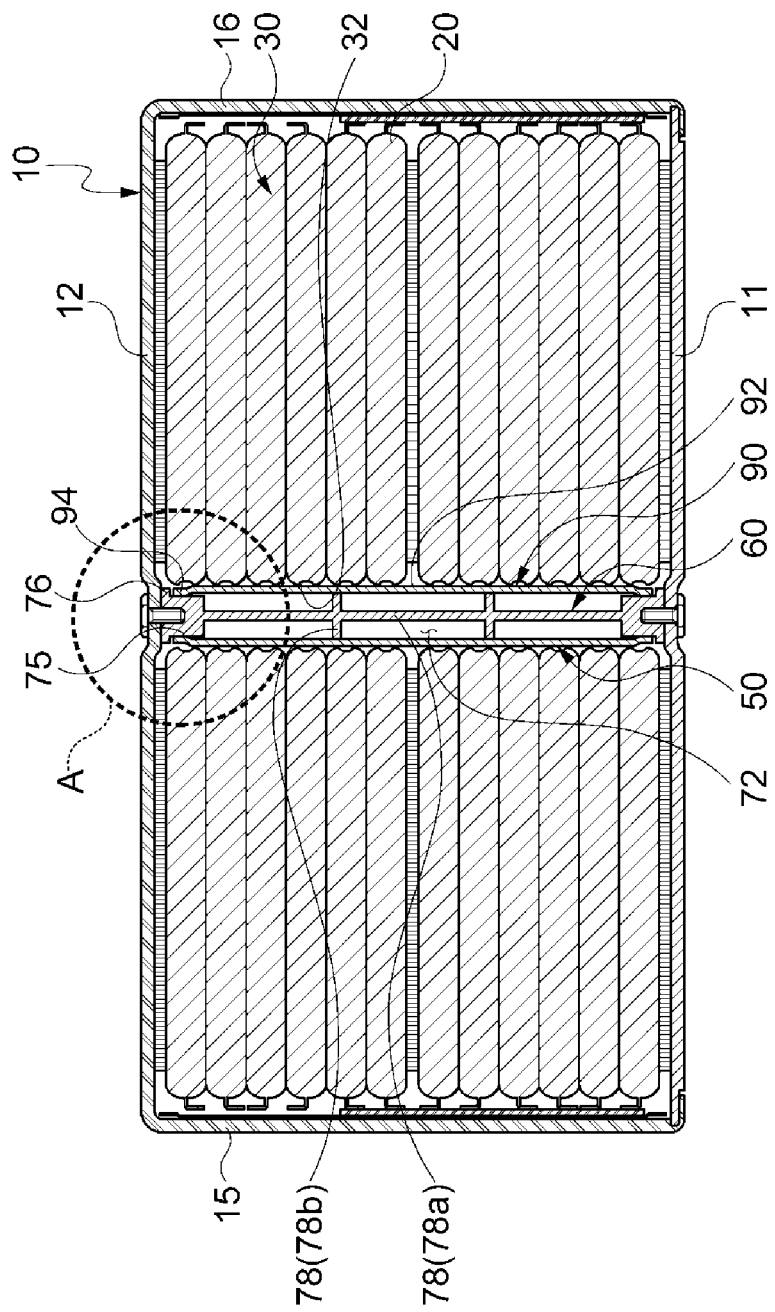
FIG. 3 is a cross-sectional view of a battery module according to an embodiment of the present invention.

FIG. 1 is a perspective view of a battery module according to an embodiment of the present invention, FIG. 2 is an exploded perspective view of a battery module according to an embodiment of the present invention, and FIG. 3 is a cross-sectional view of a battery module according to an embodiment of the present invention.

A battery module 1 may include a module housing 10, a plurality of battery cells 20 and heat exchange units 50, which are provided inside the module housing 10.

The module housing 10 may include a lower housing 11, an upper housing 12 provided on a side opposite to the lower housing 11, a front housing 13 and a rear housing 14 disposed in front and rear of the upper housing 12 and the lower housing 11. In addition, the module housing 10 may include a left housing 15 and a right housing 16 disposed on left and right sides. In the present embodiment, the configuration, in which the left housing 15 and the right housing 16 are integrally formed with the upper housing 12, has been illustrated, but it is not limited thereto.

The module housing 10 may form an arrangement space 10a in which a plurality of battery cells 20 and the heat exchange unit 50 can be disposed. Contents of combining the module housing 10, the plurality of battery cells 20, and the heat exchange unit 50 will be described in detail below.

As described above, the plurality of battery cells 20 may be provided. The plurality of battery cells 20 may constitute one battery pack 30. The battery pack 30 may be configured by stacking the plurality of battery cells 20. The plurality of battery packs 30 may be disposed so as to be divided by the heat exchange unit 50. The heat exchange unit 50 may be disposed between the plurality of battery packs 30 to perform heat exchange in contact with the plurality of battery packs 30 disposed on both sides.

The heat exchange unit 50 may be configured to cool heat generated from the battery cells 20. The heat exchange unit 50 may be disposed to be in contact with the plurality of stacked battery cells 20. The battery module 1 may further include a thermal contact member (not illustrated). The thermal contact member is disposed between the plurality of battery cells 20 and the heat exchange unit 50, and may be configured to increase a thermal contact area with both components. The heat exchange unit 50 may be disposed between a pair of battery packs 30. The heat exchange unit 50 may be disposed between the pair of battery packs 30, and may be arranged to face stacked surfaces 32 (see FIG. 3) of the pair of battery packs 30. That is, the heat exchange unit 50 may be configured to contact with the stacked surfaces 32 of the battery packs 30. Thereby, the heat exchange unit 50 divides between the battery packs 30 to function as a barrier, and may be configured to effectively absorb heat radiated to the stacked surfaces 32 of the battery packs 30. The heat exchange unit 50 will be described in detail below. Although it was named the heat exchange unit 50, it may be named a heat exchange part or a heat sink, and any configuration may be used so long as it can sufficiently cool the battery cells 20. The configuration is not limited by the name of the heat exchange unit 50 itself. Further, in the present embodiment, the heat exchange unit 50 having the configuration, in which a refrigerant such as coolant flows, has been described, but may have a configuration in which the refrigerant is stored or a configuration in which the refrigerant is not used.

The battery module 1 may include bus bars 40. The bus bar 40 may be disposed on at least one side of the battery pack 30 to allow an electrical connection between the plurality of battery cells 20 forming the battery pack 30. The bus bar 40 may be configured to cover a surface of the battery pack on which electrode tabs 21 (see FIG. 9) are disposed among the surfaces on which the battery cells 20 are stacked. Outsides of the bus bars 40 may be covered by bus bar covers (not illustrated) to protect the bus bars 40. The bus bar covers may be disposed between the bus bars 40 and the front and rear housings 13 and 14.

Figure 4:
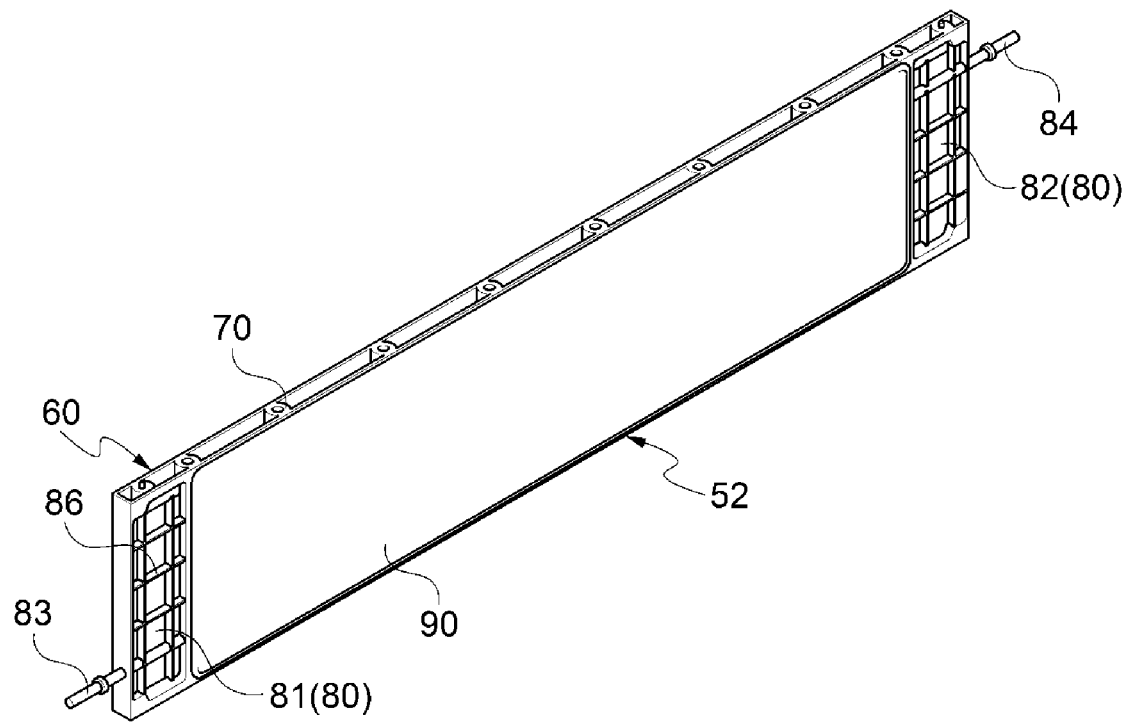
FIG. 4 is a perspective view of a heat exchange unit of the battery module according to an embodiment of the present invention.
Figure 5:
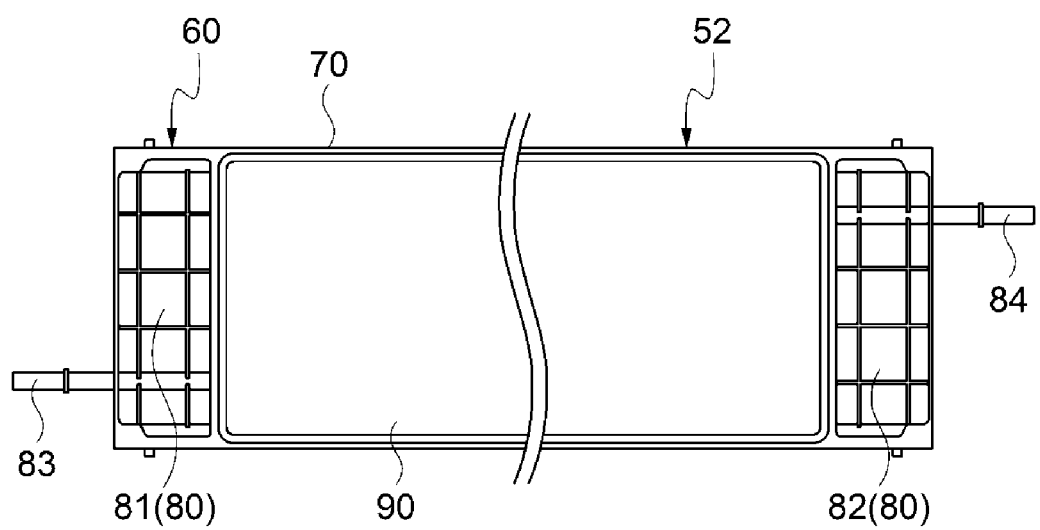
FIG. 5 is a front view of the heat exchange unit of the battery module according to an embodiment of the present invention.
Figure 6:
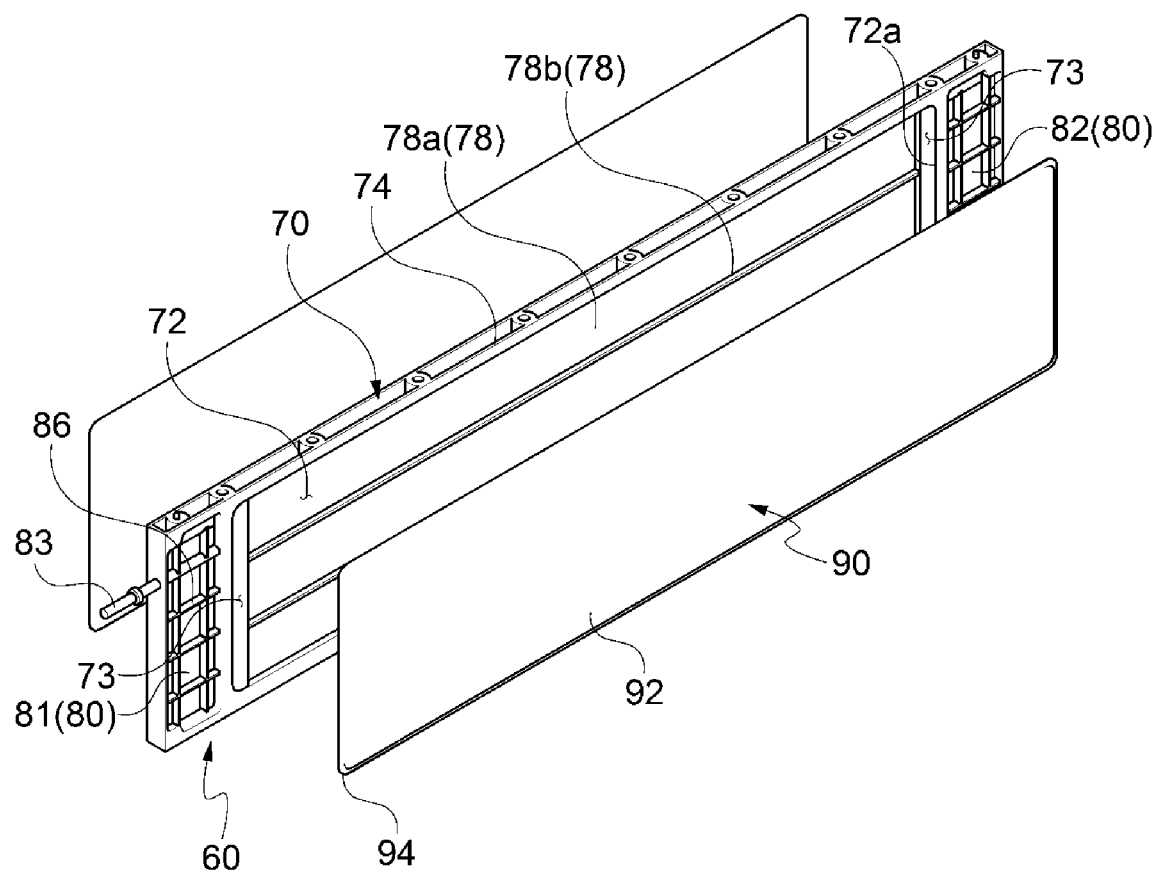
FIG. 6 is an exploded perspective view of the heat exchange unit of the battery module according to an embodiment of the present invention.
Figure 7:
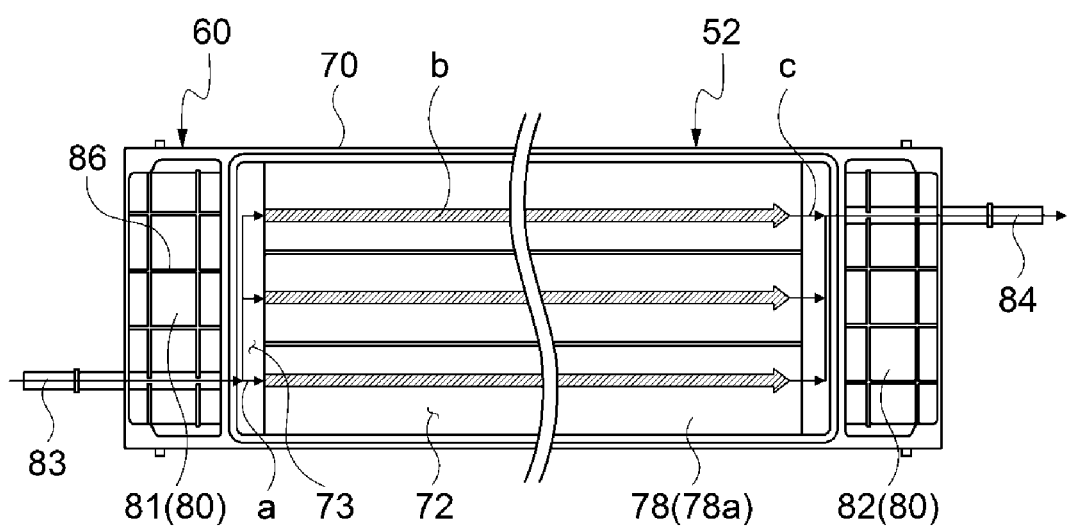
FIG. 7 is a schematic view illustrating flow of coolant in the heat exchange unit of the battery module according to an embodiment of the present invention.

FIG. 4 is a perspective view of the heat exchange unit of the battery module according to an embodiment of the present invention, FIG. 5 is a front view of the heat exchange unit of the battery module according to an embodiment of the present invention, FIG. 6 is an exploded perspective view of the heat exchange unit of the battery module according to an embodiment of the present invention, and FIG. 7 is a schematic view illustrating flow of coolant in the heat exchange unit of the battery module according to an embodiment of the present invention. The present invention will be further described together with the previously mentioned drawings.

The heat exchange unit 50 may be configured to cool the battery pack 30 in which the plurality of battery cells 20 are stacked.

The heat exchange unit 50 may include a flow frame 60 and a frame cover 90. The flow frame 60 and the frame cover 90 may form a flow space 72 (see FIG. 6) through which coolant flows by coupling with each other.

The frame cover 90 may be configured to form an outer surface of the heat exchange unit 50 and contact with the plurality of battery cells 20. The frame cover 90 may be made of a material having a higher thermal conductivity than the flow frame 60. That is, the flow frame 60 and the frame cover 90 may be made of different types of materials. The frame cover 90, on which direct heat exchange is performed with the battery cell 20 and the battery pack 30, may be made of a material having a relatively high thermal conductivity compared to the flow frame 60, such that heat exchange efficiency may be improved. In addition, since the flow frame 60, which does not require a relatively high thermal conductivity, can be easily changed in shape, it may have different shape depending on the capacity or arrangement of the battery pack. Thereby, a flow space and a flow channel of the flow frame 60 may be modified depending on the required cooling amount.

The materials of the flow frame 60 and the frame cover 90 are not limited, but for example, the flow frame 60 may include a plastic material, and the frame cover 90 may include a metal material. However, it is not limited thereto, and any material may be used so long as it satisfies that the frame cover 90 forming the outer surface is made of a material having a higher thermal conductivity than the flow frame 60. The flow frame 60 may include a flow part 70 and an extension part 80.

The flow part 70 may be provided to be covered by the frame cover 90, and may form the flow space 72 together with the frame cover 90. That is, the frame cover 90 may be configured to cover only the flow part 70 of the flow frame 60. The flow part 70 may include an opening 72a (see FIG. 6) configured to be communicated with the flow space 72 and sealed by the frame cover 90.

The flow part 70 may include a frame body 74 and a channel division part 78.

The frame body 74 may be configured to form a frame of the flow part 70. The frame body 74 may be formed along a circumference of the flow space 72. That is, the frame body 74 may form the circumference of the flow space 72. The frame cover 90 may be coupled to the frame body 74 thus to be mounted on the flow part 70.

The channel division part 78 may be disposed inside the frame body 74. The channel division part 78 may be configured to divide the flow space 72. The channel division part 78 may divide the flow space 72 into a plurality of flow channels, thereby allowing the inflowing coolant may be uniformly flowed in the flow space 72.

The channel division part 78 may include first and second division parts 78a and 78b.

The first division part 78a may be disposed in the flow space 72 in a vertical direction. That is, the first division part 78a may divide the flow space 72 horizontally. The first division part 78a may form a width of the flow channel through which the coolant flows.

The second division part 78b may be disposed in the flow space 72 in a horizontal direction. That is, the second division part 78b may divide the flow space 72 vertically. The second division part 78b may form a depth of the flow channel through which the coolant flows.

In the present embodiment, one first division part 78a and two second division parts 78b are provided to divide the flow space 72 into six channels, but it is not limited thereto.

An extension part 80 may be configured to extend from the flow part 70. The extension part 80 may be configured to extend in the same plane direction as the flow part 70. The extension part 80 extends from the flow part 70, but may be formed in a plate shape. Through this configuration, even when the frame cover 90 is mounted on the flow frame 60, the extension part 80 may be configured not to be covered by the frame cover 90. The extension part 80 may include a first extension part 81 disposed on one side of the flow part 70 and a second extension part 82 disposed on the other side of the flow part 70.

The extension part 80 may include an inlet 83 and an outlet 84 connected with the flow space 72. The inlet 83 and the outlet 84 may be disposed in the first and second extension parts 81 and 82, respectively. The coolant inflowing into the inlet 83 may pass through the flow space 72 of the flow part 70 and be discharged to the outlet 84.

The extension part 80 may include a reinforcement part 86 to reinforce strengths for the inlet 83 and the outlet 84. The reinforcement part 86 may protrude in a grid shape, thus to function to reinforce the strengths of the inlet 83 and the outlet 84.

The flow part 70 may include gap spaces 73 (see FIGS. 6 and 7). The gap spaces 73 are disposed in the flow space 72, and may be configured to prevent a decrease in fluidity of the coolant due to a flow resistance caused by the channel division part 78.

The gap space 73 may be formed between the channel division part 78 and the extension part 80. In detail, the gap spaces 73 may be formed between the channel division part 78 and the inlet 83, and between the channel division part 78 and the outlet 84. The gap spaces 73 may be formed by being spaced apart between the channel division part 78 and the inlet 83 and between the channel division part 78 and the outlet 84.

The coolant introduced through the inlet 83 first inflows into the gap space 73 between the inlet 83 and the channel division part 78 (a of FIG. 7), and then divided into streams in the gap space 73 to flow through the flow channels divided by the channel division part 78 (b of FIG. 7). The streams of coolant that have passed through the flow channels flow into the gap space 73 between the outlet 84 and the channel division part 78 (c of FIG. 7), and are discharged from the gap space 73 to the outlet 84. Through this process, it is possible to prevent the fluidity of the coolant from being deteriorated due to a difference in a flow cross-sectional area in the inlet 83, the outlet 84, and the flow space 72, or flow friction.

A pair of frame covers 90 may be provided to be disposed on both sides of the flow part 70, respectively. That is, the openings 72a formed on both sides of the flow part 70 may be covered by the pair of frame covers 90, such that the flow space 72 may be formed therein. The frame cover 90 may include a cover body 92 which forms the flow space 72 together with the flow part 70, and a cover coupling part 94 which is disposed around the cover body 92 to be coupled to the flow part 70.

The cover coupling part 94 may be configured to be coupled to a mounting part 75 of the frame body 74, which will be described below. A method of coupling the cover coupling part 94 to the mounting part 75 of the frame body 74 is not limited. For example, the cover coupling part 94 may be bonded to the mounting part 75 by thermal fusion, or may be bolted. The cover coupling part 94 may have any configuration so long as it satisfies that the frame cover 90 is coupled to the mounting part 75 so as to seal the flow space 72.

Figure 8:
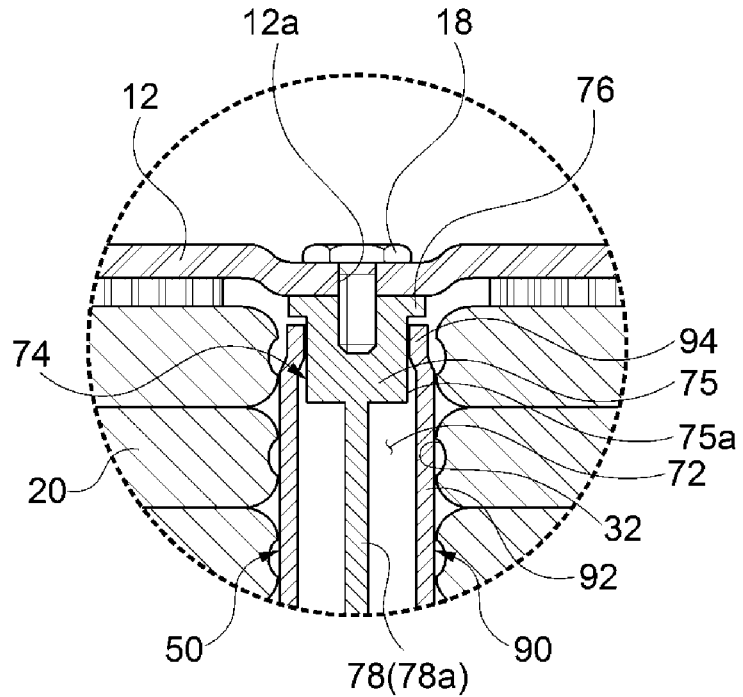
FIG. 8 is an enlarged view of A in FIG. 3.

FIG. 8 is an enlarged view of A in FIG. 3. The present invention will be further described together with the previously mentioned drawings.

The frame body 74 is coupled to the module housing 10, such that the heat exchange unit 50 may be fixed to the module housing 10. The frame body 74 may be configured to be coupled to the module housing 10. In detail, the configuration, in which one side and the other side of the frame body 74 are respectively coupled to the upper housing 12 and the lower housing 11, has been illustrated in the drawings. For example, as shown in FIG. 8, the frame body 74 and the upper housing 12 may be joined with bolt 18 in such a manner that a screw penetrates a coupling groove 12a of the upper housing 12 and is inserted into a hole of the frame body 74. However, it is not limited thereto, and the frame body 74 of the heat exchange unit 50 may be directly coupled to or integrally formed with the module housing 10.

The frame body 74 may include the mounting parts 75 and mounting guides 76.

The mounting part 75 may be configured so that the frame cover 90 is mounted. In detail, the cover coupling part 94 of the frame cover 90 may be configured to be mounted on a mounting surface 75a of the mounting part 75.

The mounting guide 76 may be formed along the circumference of the mounting part 75. The mounting guide 76 may be configured to guide the cover coupling part 94 of the frame cover 90 to be mounted on the mounting part 75. The mounting guide 76 may be configured to be disposed along the circumference of the cover coupling part 94 when the frame cover 90 is mounted on the mounting part 75. The mounting guide 76 may position the cover coupling part 94 by supporting the circumference of the cover coupling part 94 when the cover coupling part 94 is located on the mounting part 75.

The mounting guide 76 may be configured to prevent the cover coupling part 94 of the frame cover 90 and the module housing 10 from being in direct contact with each other. To this end, the mounting guide 76 may be configured to protrude from the mounting surface 75a of the mounting part 75. That is, when the frame cover 90 is mounted on the mounting part 75, the mounting guide 76 is disposed between the circumference of the cover coupling part 94 of the frame cover 90 and the module housing 10, thereby preventing the cover coupling part 94 and the module housing 10 from being in direct contact with each other. Thereby, it is possible to prevent heat transferred to the frame cover 90 from being transferred to the module housing 10.

Figure 9:
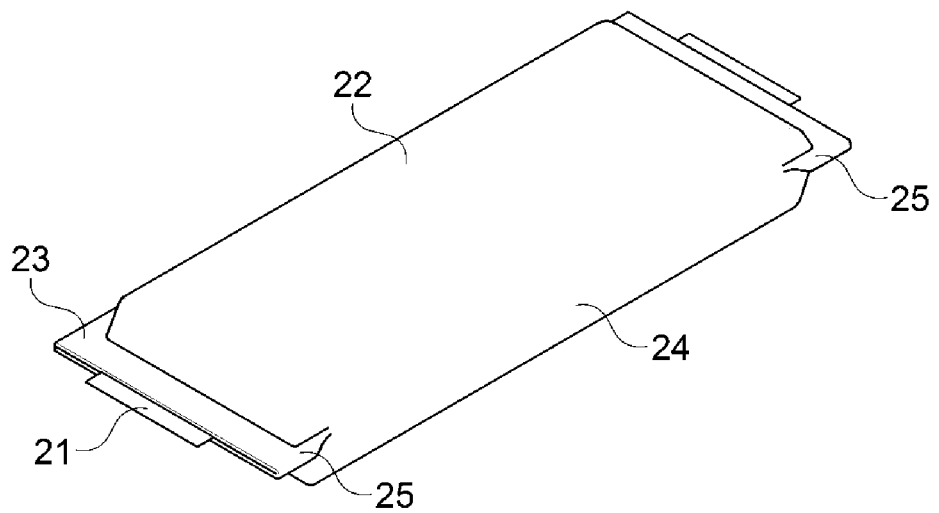
FIG. 9 is a perspective view of a battery cell of a battery module according to an embodiment of the present invention.
Figure 10:
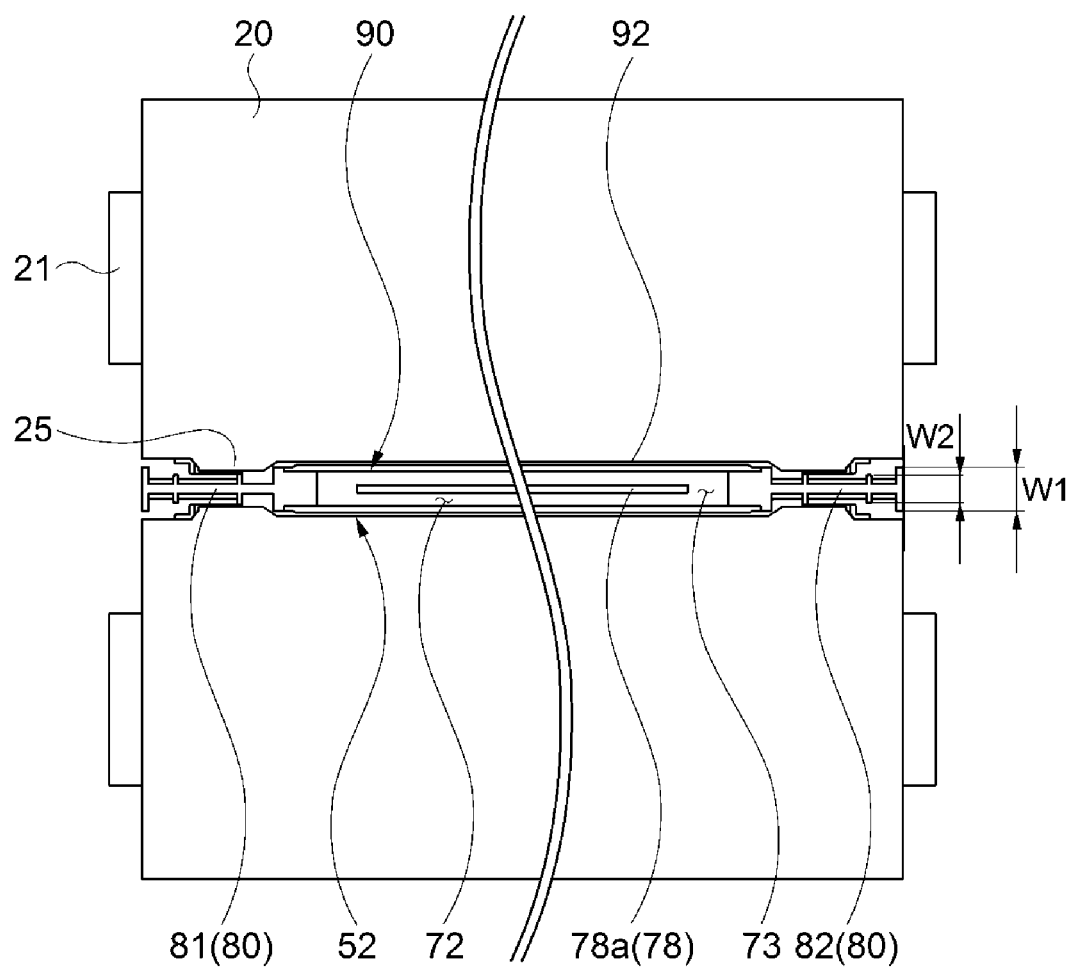
FIG. 10 is a schematic view illustrating an arrangement of the battery cell and the heat exchange unit of the battery module according to an embodiment of the present invention.

FIG. 9 is a perspective view of a battery cell of a battery module according to an embodiment of the present invention, and FIG. 10 is a schematic view illustrating an arrangement of the battery cell and the heat exchange unit of the battery module according to an embodiment of the present invention.

The battery cell 20 may include an electrode assembly (not illustrated) from which the electrode tabs 21 are drawn out, and a case 22 which houses the electrode assembly. The case 22 may include a sealing part 23 in which adhering is performed with the case 22 and a circumferential part 24 in which adhering is not performed. The circumferential part 24 may refer to a portion of the circumference of the case 22 except for the sealing part 23. The sealing part 23 may be formed on three sides among four sides of the circumference formed by the case 22, and the circumferential part 24 may be formed on a side other than the three sides.

The case 22 may include protrusion parts 25. The protrusion parts 25 may be formed between the sealing part 23 and the circumferential part 24. That is, the protrusion part 25 may be configured to protrude from the circumferential part 24 in a process of forming the sealing part 23 and the circumferential part 24.

The heat exchange unit 50 may include a heat exchange part 52 and the extension part 80. The heat exchange part 52 may include the flow part 70 and the frame cover 90 coupled to the flow part 70 so that the coolant flows as described above.

The frame cover 90 of the heat exchange part 52 may be disposed to correspond to the circumferential part 24 of the battery cell 20, and the extension part 80 may be disposed to correspond to the protrusion part 25 of the battery cell 20. Since the protrusion part 25 is formed to protrude from the circumferential part 24, there may be a problem in that durability of the secondary battery is deteriorated due to wear caused by an external environment.

The extension part 80 may be configured so as not to interfere with the protrusion part 25 of the battery cell 20. The extension part 80 may be configured to form a second width w2 smaller than a first width w1 formed by the heat exchange part 52. That is, the frame cover 90 of the heat exchange part 52 may contact with the circumferential part 24 of the battery cell 20, and the extension part 80 may be formed in a narrower width to avoid interference with the protrusion part 25 that protrudes from the circumferential part 24. Through this configuration of the extension part 80, it is possible to prevent the protrusion part 25 from being in contact with the heat exchange unit 50 to be worn, which may be caused as the battery cell 20 comes into contact with the heat exchange unit 50.

The extension part 80 may be made of an insulation material. Since the extension part 80 is made of an insulation material, it is possible to prevent a short circuit from the protrusion part 25.

Hereinafter, a battery module according to another embodiment of the present invention will be described. In the following description, the same configuration as the above-described configuration will not be repeatedly described.

Figure 11:
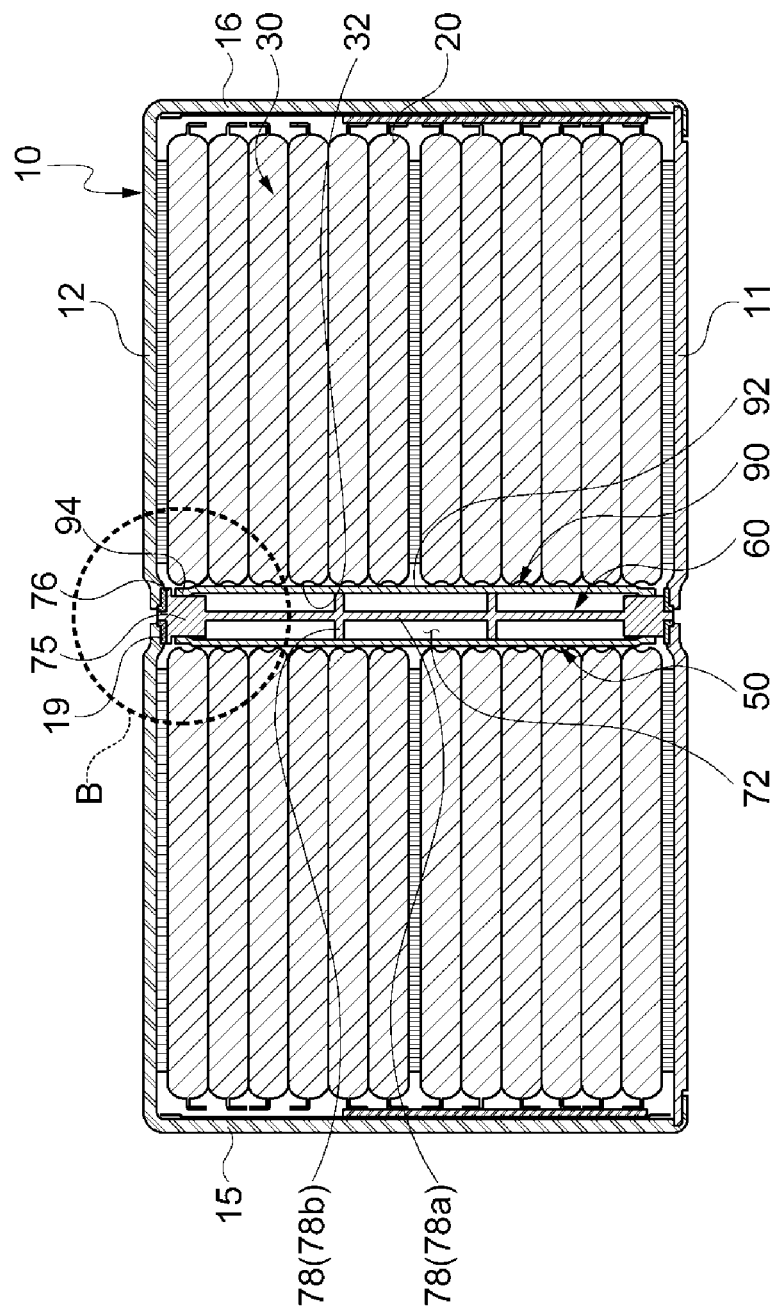
FIG. 11 is a cross-sectional view of a battery module according to another embodiment of the present invention.
Figure 12:
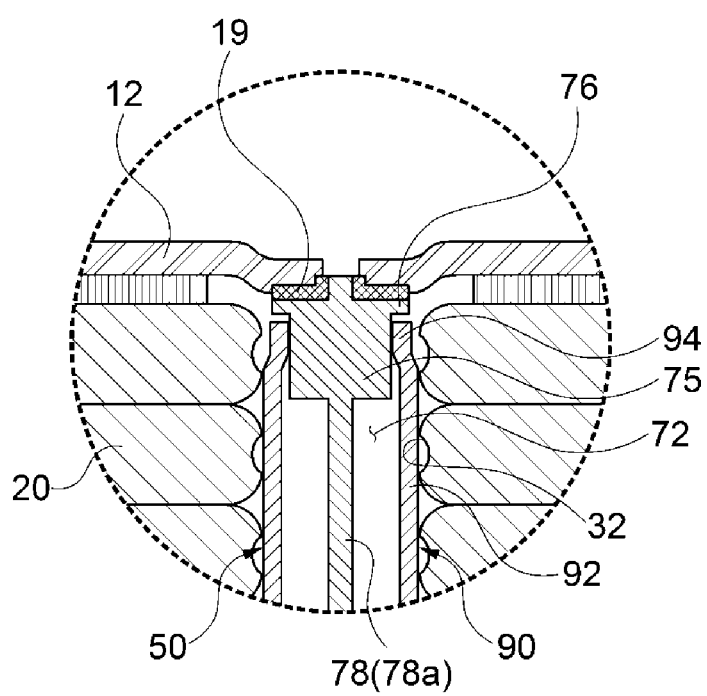
FIG. 12 is an enlarged view of B in FIG. 11.

FIG. 11 is a cross-sectional view of a battery module according to another embodiment of the present invention, and FIG. 12 is an enlarged view of B in FIG. 11.

In the previous embodiment, the configuration, in which the heat exchange unit 50 and the module housing 10 are joined with bolt 18, has been described as an example. In this embodiment, the heat exchange unit 50 and the module housing 10 may be coupled by thermal fusion 19.

The frame body 74 may be configured to be coupled to the module housing 10. In detail, the configuration, in which one side and the other side of the frame body 74 are respectively coupled to the upper housing 12 and the lower housing 11, has been illustrated in the drawings. As shown in FIGS. 11 and 12, the frame body 74 and the upper housing 12 may be coupled with each other through the thermal fusion 19. However, it is not limited thereto, and the frame body 74 of the heat exchange unit 50 may be directly coupled to or integrally formed with the module housing 10.

As such, specific embodiments of the present invention have been illustrated and described in detail. However, the present invention is not limited to the above embodiments, and it will be understood by those skilled in the art that various alterations and modifications may be implemented without departing from technical spirits of the invention described in the following claims.

DESCRIPTION OF REFERENCE NUMERALS

1: Battery module
10: Housing
20: Battery cell
22: Case
23: Sealing part
24: Circumferential part
25: Protrusion part
30: Battery pack
32: Stacked surface
50: Heat exchange unit
60: Flow frame
70: Flow part
72: Flow space
73: Gap space
74: Frame body
75: Mounting part
76: Mounting guide
78: Channel division part
80: Extension part
83: Inlet
84: Outlet
90: Frame cover
92: Cover body
94: Cover coupling part

What is claimed is:

1. A battery module comprising:
a plurality of battery cells arranged into at least two stacks positioned adjacent to each other;
a heat exchange unit disposed between the at least two stacks, the heat exchange unit comprising a flow frame and a frame cover coupled to each other to form a flow space through which a coolant flows, and
a module housing configured to form an internal space in which the plurality of the battery cells and the heat exchange unit are mounted;
wherein the frame cover is in contact with the plurality of the battery cells,
wherein the frame cover is coupled to the flow frame to form a flow space, through which the inflowing and outflowing coolant flows,
wherein the flow frame includes a flow part configured to be covered by the frame cover to form the flow space,
wherein the flow part includes a frame body configured to form a circumference of the flow space,
wherein the frame body and the module housing are coupled with each other, and
wherein the frame cover includes:
a cover body facing the plurality of battery cells; and
a cover coupling part extending from the cover body, the cover coupling part coupled to the frame body.

2. The battery module according to claim 1,
wherein the frame cover includes a pair of frame covers disposed on opposite sides of the flow frame, and
wherein each of the pairs of the frame covers is in contact with one of the at least two stacks of the plurality of the battery cells.

3. The battery module according to claim 1, wherein the frame cover in contact with the plurality of the battery cells is made of a material having a higher thermal conductivity than a material of the flow frame.

4. The battery module according to claim 3, wherein the material of the flow frame includes a plastic, and
the material for the frame cover includes a metal.

5. The battery module according to claim 1, wherein the flow frame comprises first and second extension parts including an inlet and an outlet, respectively, the inlet and outlet being fluidly connected with the flow space and extending from the flow part.

6. The battery module according to claim 5, wherein the flow part comprises a channel division part configured to divide the flow space inside the frame body.

7. The battery module according to claim 6, wherein the flow part includes gap spaces configured so that the channel division part is spaced apart from the inlet.

8. The battery module according to claim 7, wherein the channel division part is configured to divide and guide flow of the coolant passing through the gap spaces through the inlet.

9. The battery module according to claim 1,
wherein the heat exchange unit is configured so that one side and the other side of the frame body are respectively coupled to and fixed to the module housing.

10. The battery module according to claim 9, wherein the frame body comprises:
a mounting part on which a circumference of the frame cover is mounted; and
a mounting guide disposed along a circumference of the mounting part to guide the frame cover to be mounted on the mounting part,
wherein the mounting guide is configured to prevent the frame cover and the module housing from contacting with each other.

11. The battery module according to claim 10, wherein the mounting guide is disposed between the mounting part and the module housing, and is configured to protrude from the mounting part along the circumference of the frame cover.

12. The battery module according to claim 1, wherein the frame body and the module case are coupled with each other by at least one of bolting and thermal fusion.

13. The battery module according to claim 5, wherein each of the plurality of the battery cells comprises:
a sealing part and a circumferential part formed by the module housing, wherein the sealing part is formed on three sides among four sides of circumference formed by the battery cells and is formed by adhering the module housing, and the circumferential part is formed on a side of the battery cell other than the three sides; and
a protrusion part formed between the sealing part and the circumferential part and formed to protrude from the circumferential part,
wherein the frame cover is configured to be positioned adjacent to and in contact with the circumferential part, and the extension part is configured to accommodate the protrusion part.

14. The battery module according to claim 13, wherein the extension part is configured to have a second width smaller than a first width formed by the frame cover and the flow part to avoid interference with the protrusion part.

15. The battery module according to claim 13, wherein the extension part is made by including an insulation material to prevent a short circuit in the protrusion parts facing each other.

16. The battery module according to claim 5, wherein the extension part extends from the flow part in the same plane direction as the flow part and is not covered by the frame cover.

17. The battery module according to claim 5, wherein the extension part comprises a reinforcement part configured to reinforce strengths of the inlet and the outlet.

18. The battery module according to claim 5,
wherein the extension part includes a first extension part disposed on a first side of the flow part and a second extension part disposed on second side of the flow part opposite to the first side.

* * * * *